United States Patent
Kippie et al.

(10) Patent No.: US 7,767,628 B2
(45) Date of Patent: Aug. 3, 2010

(54) METHOD FOR FOAMING A HYDROCARBON DRILLING FLUID AND FOR PRODUCING LIGHT WEIGHT HYDROCARBON FLUIDS

(75) Inventors: David P. Kippie, San Antonio, TX (US); Larry W. Gatlin, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 985 days.

(21) Appl. No.: 11/293,859

(22) Filed: Dec. 2, 2005

(65) Prior Publication Data

US 2007/0129257 A1 Jun. 7, 2007

(51) Int. Cl.
*C09K 8/38* (2006.01)
*E21B 21/14* (2006.01)

(52) U.S. Cl. ........................................ 507/103; 175/69
(58) Field of Classification Search .................. 507/103; 175/69
See application file for complete search history.

(56) References Cited

U.S. PATENT DOCUMENTS

| | | | | |
|---|---|---|---|---|
| 3,021,277 A | * | 2/1962 | Hoeppel | 507/138 |
| 3,593,794 A | * | 7/1971 | Fischer et al. | 166/283 |
| 4,225,445 A | * | 9/1980 | Dixon | 507/222 |
| 4,432,882 A | * | 2/1984 | Raynolds et al. | 507/202 |
| 5,228,524 A | * | 7/1993 | Johnson et al. | 175/72 |
| 5,647,900 A | * | 7/1997 | Smith et al. | 106/285 |
| 6,100,222 A | * | 8/2000 | Vollmer et al. | 507/113 |
| 6,460,632 B1 | * | 10/2002 | Chatterji et al. | 175/66 |
| 2002/0023752 A1 | * | 2/2002 | Qu et al. | 166/308 |
| 2005/0130847 A1 | | 6/2005 | Gatlin et al. | |
| 2005/0137114 A1 | | 6/2005 | Gatlin et al. | |
| 2005/0153846 A1 | | 7/2005 | Gatlin | |
| 2005/0250666 A1 | | 11/2005 | Gatlin et al. | |
| 2006/0116296 A1 | | 6/2006 | Kippie et al. | |
| 2006/0194700 A1 | | 8/2006 | Gatlin et al. | |

OTHER PUBLICATIONS

U.S. Appl. No. 11/328,432, Wilson.
U.S. Appl. No. 11/298,547, Gatlin et al.
U.S. Appl. No. 11/298,556, Gatlin et al.
U.S. Appl. No. 11/339,303, Lukos et al.
U.S. Appl. No. 11/545,387, filed Oct. 10, 2006, Gatlin et al.
U.S. Appl. No. 11/554,834, filed Oct. 31, 2006, Venditto et al.

* cited by examiner

*Primary Examiner*—Timothy J. Kugel
(74) *Attorney, Agent, or Firm*—Robert W. Strozier

(57) ABSTRACT

A hydrocarbon drilling fluid system is disclosed including a hydrocarbon fluid and a foaming composition, where the foaming composition includes a polymer, a gelling agent and its cross-linking agent, an optional foaming agent, or mixtures or combinations thereof. Uses of this drilling fluid system in a variety of downhole application are also disclosed.

29 Claims, 1 Drawing Sheet

METHOD FOR FOAMING A HYDROCARBON DRILLING FLUID AND FOR PRODUCING LIGHT WEIGHT HYDROCARBON FLUIDS

BACKGROUND OF THE INVENTION

1. Field of the Invention

The present invention relates to a method for drilling, completing, producing, fracturing and stimulating a gas and/or oil well using a hydrocarbon fluid compositions having improved foaming properties, improved gas retention properties, and improved pumping properties. The invention also relates to methods for making the compositions and to compositions.

More particularly, the present invention relates to a method for producing a stable, hydrocarbon drilling fluid foam, where the method includes the step of pumping a pre-gasified, foamable hydrocarbon drilling fluid into a drilling string and/or a borehole of a well during drilling operations. As the fluid passes through a drill bit at the end of the drill string and into the well, the fluid changes from a pre-gasified, foamable hydrocarbon drilling fluid into a stable hydrocarbon drilling foam resulting in a decrease in column weight of the fluid in and an increase in a withdrawal rate of the drilling fluid and/or cutting from the well. After the stable hydrocarbon drilling foam exits the well, the foam defoamed or broken using a defoamer. The defoamed hydrocarbon drilling fluid is then refoamed with or without the addition of a refoaming additive or additional foamer. The present invention also relates to other uses of the compositions of this invention. The present invention also relates to a drilling fluid composition including a hydrocarbon fluid, a viscosifying composition, optionally a foaming agent and optionally a gas and, especially to a pre-gasified, foamable hydrocarbon fluid.

2. Description of the Related Art

In oil and gas drilling operations, it has been the almost universal practice up until recent years to circulate a liquid, such as water, oil, a water-in-oil emulsion, or an oil-in-water emulsion, usually with mud solids, clay particles, suspended therein, to and from the drilling zone during the drilling operation. One of the functions in circulating these drilling fluids, usually in the form of a drilling mud, is to remove drilled solids from the bit and lift cuttings from the bore. As can be readily understood the drilling liquid must be circulated under high pressure to assure entrainment of cuttings and expulsion of mud from the bore hole.

In recent years, some wells have been successfully drilled at a reduced pressure by a different technique in which a compressed gas, such as air, nitrogen or mixtures thereof, is pumped into the well along with drilling fluid at the drilling site. Cryogenic nitrogen (99.9999% $N_2$) and membrane nitrogen (>93% $N_2$) are the most common gases used since they are provide a safer drilling environment since hydrocarbons particularly natural gas can be flammable in gas environments possessing great than 7% oxygen content. This technique is called underbalanced drilling or managed pressure drilling. The compressed gas flows rapidly up the well bore annulus around the drill collar carrying with it the drilled solids and thus removing them from the drill hole. While in some instances, the drilling operation is essentially a dry process in many formations, water high in electrolyte concentration, enters the bore hole from adjacent water-containing strata. Such water invasion most often occurs while drilling in or through a water bearing subterranean zone, but may also be encountered in any area in the vicinity of trapped underground water.

Some of the advantages of the underbalanced or managed pressure drilling method over the more conventional mud drilling method include increased penetration rate, longer bit life, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones known as formation damage, and greater flexibility in physical-chemical alteration of the drilling fluid to meet particular down hole conditions such as adjusting the fluid density by changing the gas to liquid ratio. However, one difficulty in under-balanced or managed drilling where water seeps into the bore and accumulates in the drilling zone is that the drilled solids tend to agglomerate as the drill string rotates. These agglomerated masses become too heavy to be lifted out by gas alone which leads to many drilling problem such as stick drill pipe. As a result, rheology modifiers or thickeners must be used to suspend the drill cutting. Cutting suspension in under-balanced or manage pressure drilling typically is achieved with foaming agents.

In recent years, the technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

The requirements for utilization of an aqueous foam in subterranean formations include high stability with waters containing appreciable quantities of soluble salts, such as sodium chloride, potassium chloride, calcium salts and/or magnesium salts, iron salts, and the capability for handling a variety of foam breaking elements such as crude oil and solids. Further the foam must not degrade under extremes of physical environments.

Numerous foam compositions have been proposed and used under such conditions, however most have proven unsatisfactory in one respect or another. Among the various classes of foaming compositions are nonionics; however, these are affected by salts and high temperatures encountered in drilling. Although many anionic surfactants provide acceptable foams in soft waters, they form foam breaking precipitates in the presence of brine and/or hard water. Cationics and zwitterionics are ineffective foamers because of their intolerance to high salinity. Foams used with hydrocarbon based drilling fluids such as diesel or kerosene based drilling fluids are difficult to foam and if foamed, are difficult to maintain for time sufficient for circulation through the well.

To our knowledge, there is no single-phase oil base foam drilling fluid on the market. However, many current drilling operations are using two-phase systems, in which air or nitrogen is injected into crude oil or diesel without the addition of chemical. Also, many drilling fluids use emulsified oil and $CaCl_2$ brine to achieve a low density drilling fluid. However, many of these types of systems are used in conventional, over-balanced drilling. The potential problem with a two-phase drilling fluid is once the pump rate decreases gas begins to migrate out of the fluid. As the gas migrates out of the fluid, the drilling fluid begins to lose viscosity especially "low-end" or thixtropic viscosity, which is critical for hole-cleaning. As a result, a cutting bed is established which is attributed to several drilling problem like differential sticking.

By drilling with a stable single-phase system, the problems associated with hole cleaning due to loss of viscosity is greatly reduced. Thus, there is a need in the art for oil-based drilling fluids that are capable of producing a stable oil-based drilling fluid foam.

SUMMARY OF THE INVENTION

The present invention provides a method for forming a hydrocarbon drilling fluid pre-foam including the step of adding an effective amount of foaming composition to a hydrocarbon drilling fluid to form a foamable hydrocarbon drilling fluid capable of producing a more stable hydrocarbon drilling fluid foam, where the foaming composition includes a viscosifying agent and optionally a foaming agent. The viscosifying agent includes a polymer, a cross-linkable composition or mixtures or combinations thereof. The cross-linkable composition includes a gelling agent and a low concentration of a cross-linking agent. Once the foaming composition has been added to the hydrocarbon drilling fluid, a gas such as air, nitrogen, membrane nitrogen, other nitrogen/oxygen gas mixtures, carbon dioxide, an inert gas, methane, natural gas, exhaust gas, flue gas or other similar gases or mixtures or combinations thereof is added to the fluid under conditions sufficient to produce the pre-foam. The pre-foam is capable of being pumped directly into a drill string through conventional pumps without cavitation or vapor locking encountered in tradition gas-liquid combinations. When the pre-foam undergoes a pressure drop such as when it exists the drill bit, the pre-foam spontaneously converts to a foam, which lightens the fluid column weight and improves removal of the drilling fluid and the entrainment of cuttings or other materials in the well.

The present invention provides a method for forming a stable hydrocarbon drilling fluid foam including the step of adding an effective amount of foaming composition to a hydrocarbon drilling fluid to form a foamable hydrocarbon drilling fluid capable of producing a more stable hydrocarbon drilling fluid foam, where the foaming composition includes a viscosifying agent and optionally a foaming agent. The viscosifying agent includes a polymer, a cross-linkable composition or mixtures or combinations thereof. The cross-linkable composition includes a gelling agent and a low concentration of a cross-linking agent. Once the foaming composition has been added to the hydrocarbon drilling fluid, a gas such as air, nitrogen, membrane nitrogen, other nitrogen/oxygen gas mixtures, carbon dioxide, an inert gas, methane, natural gas, exhaust gas, flue gas or other similar gases or mixtures or combinations thereof is added to the fluid under conditions sufficient to produce a stable hydrocarbon drilling fluid foam, or a pre-foam capable of producing a stable hydrocarbon drilling fluid foam.

The present invention also provides a method for foaming and defoaming a hydrocarbon drilling fluid including the step of adding an effective amount of a foaming composition to a hydrocarbon drilling fluid to form a foamable hydrocarbon drilling fluid capable of producing a more stable hydrocarbon drilling fluid foam. The foaming composition includes a viscosifying agent and optionally a foaming agent. The viscosifying agent includes a polymer, a cross-linkable composition or mixtures or combinations thereof. The cross-linkable composition includes a gelling agent and a low concentration of a cross-linking agent. Once the foaming composition has been added to the hydrocarbon drilling fluid, a gas is added to the fluid under conditions sufficient either to produce a stable hydrocarbon drilling fluid foam or a pre-foam capable of producing a stable hydrocarbon drilling fluid foam. After the stable hydrocarbon drilling fluid foam is achieved, the stable hydrocarbon drilling fluid foam can be broken by adding a sufficient amount of a defoaming agent. In drilling operations, the defoaming can be added at the wellhead as the foam exits the well or is added to the foam in a holding tank after the foam exits the well. After defoaming, a gas such air, nitrogen, membrane nitrogen, other nitrogen/oxygen gas mixtures, carbon dioxide, an inert gas, methane, natural gas, exhaust gas, flue gas or other similar gases or mixtures or combinations added to the fluid under conditions to regenerate a stable hydrocarbon drilling fluid foam or a pre-foam capable of producing a stable hydrocarbon drilling fluid foam with or without the addition of a refoaming additive and/or additional foaming composition. The foaming and defoaming process can then be repeated until the drilling process is completed or until the fluid is not economical to refoam and is replaced or replenished.

Another method for using this technology is in a non-recycle drilling mode. In this alternative method, the foaming composition is added to the hydrocarbon drilling fluid, the system is foamed by the introduction of a gas (nitrogen, membrane nitrogen, other nitrogen/oxygen gas mixtures, carbon dioxide, atmospheric oxygen, an inert gas, methane, natural gas, exhaust gas, flue gas or other similar gases or mixtures or combinations thereof), pumped downhole, and followed by being pumped to an open pit.

The present invention provides a method of drilling including the step of, while drilling, circulating a hydrocarbon drilling fluid into the borehole through the drill string. After drilling has processed to a desired extent, an oil foaming composition is injected into the hydrocarbon drilling fluid. Prior to, concurrent with or after injection of the foaming agent into the drilling fluid, a gas is injected into the fluid containing the foaming agent to produce a stable, hydrocarbon foam reducing a column weight of the drilling fluid and increasing a recirculation rate of the drilling fluid. As the drilling fluid exits the borehole at a top of the well, the foam or fluid is collected in a collector into which a defoaming agent is continuously, periodically or intermittently added to break the foam releasing the gas. Alternatively, the defoaming agent is continuously, periodically or intermittently added to the exiting foam at the wellhead causing it to break releasing the gas. After the foam has been broken releasing the gas, the fluid now including the foaming composition is recirculated into the well and refoamed via the introduction of a gas and optionally additional foaming composition if required. In one embodiment, the gas is added to the drilling fluid containing the foaming composition as it is being pumped into the drill string resulting in a lowering of a fluid weight in the drill string. As the fluid passes through the drilling bit, the fluid is disrupted resulting in the production of a stable, hydrocarbon drilling fluid foam. In one embodiment, the gas needed to produce the hydrocarbon foam is injected at the floor of the drilling platform—a traditional, but costly arrangement. In another less expensive embodiment, the gas is mixed with the fluid under pressure to produce a gasified, pre-foam fluid that is capable of being pump via conventional fluid pumps down hole, but converts into a foam upon exiting the drill bit.

The present invention also provides a method for circulating a gasified composition of this invention downhole during drilling operation. The method comprises feeding a fluid of this invention and a gas to a pressure vessel, where the gas pressures is sufficient to gasify the fluid to a desired degree and to force the fluid into and down a drill string during a drilling operation. The method also includes the step of converting the fluid to a light weight fluid as it passes through a pressure reducing orifice such as through a drill bit or a nozzle associated with the drill bit. As the fluid passes from a higher pressure to a lower pressure, the fluid spontaneously is converted into a foam. Depending on the original density of the fluid, the density of the fluid can be reduced by ½ or more. Thus, a fluid having a volume of 250 mL is converted within a second or less into a fluid having a volume of 500 mL—a 100% reduction is density. Said another way, a 7 lbs/gal fluid is converted nearly instantaneously into a 3.5 lb/gal fluid in the form of a hydrocarbon foam. The foam has greatly decreased density, has decreased frictional resistance and because it has a decreased density, lightens the fluid column weight. Moreover, the foam increases the fluid ability of entrain and hold cutting and other solids for transportation to the surface. The method also include the step of recycling the fluid exiting at the well head to the pressure vessel so that a continuously recirculating fluid system is produced. Using this type of pressure vessel arrangement would obviate the need for high pressure air injection equipment at the floor of the drilling platform, which is common practice in the industry.

Alternatively, the fluid of this system can be used with the traditional gas injection systems used today, where the gas is introduced after the fluid is pumped into the drill string at the floor of the drilling platform. In this embodiment, the gas is absorbed or dissolved in the fluid so that the fluid being pumped down the drill string is not a foam, but a gasified fluid that is converted to a foam as it transition out of a higher pressure environment into a lower pressure environment. The transition is generally assisted by a disruptive event such as shearing; however, any type of disruptive event is envision, provided that it facilitates the conversion of the gasified fluid into a light weight fluid or foam. In another embodiment, the gas can be injected into the fluid immediately after the fluid exists the pump. In another embodiment, the gas can be injected with the fluid into the intake of the pump or the two materials can be simultaneously feed to pumping system capable of handling a gas and a liquid. In any event, the result is that the material being pumped downhole is a gasified fluid, with insubstantial amounts of foam. That is, the fluid density of the fluid under pressure is substantially the same as the density of the base hydrocarbon fluid.

The present invention also provides a fluid composition comprising a hydrocarbon base-fluid, a viscosifying composition and an amount of a dissolved gas, where the viscosifying composition comprises a polymer or a gelling agent and a cross-linking agent, or mixtures or combinations thereof and where the amount of gas is sufficient to convert the fluid into a light weight fluid having a weight between about 0.75 and about 0.25 of the weight of the base fluid.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
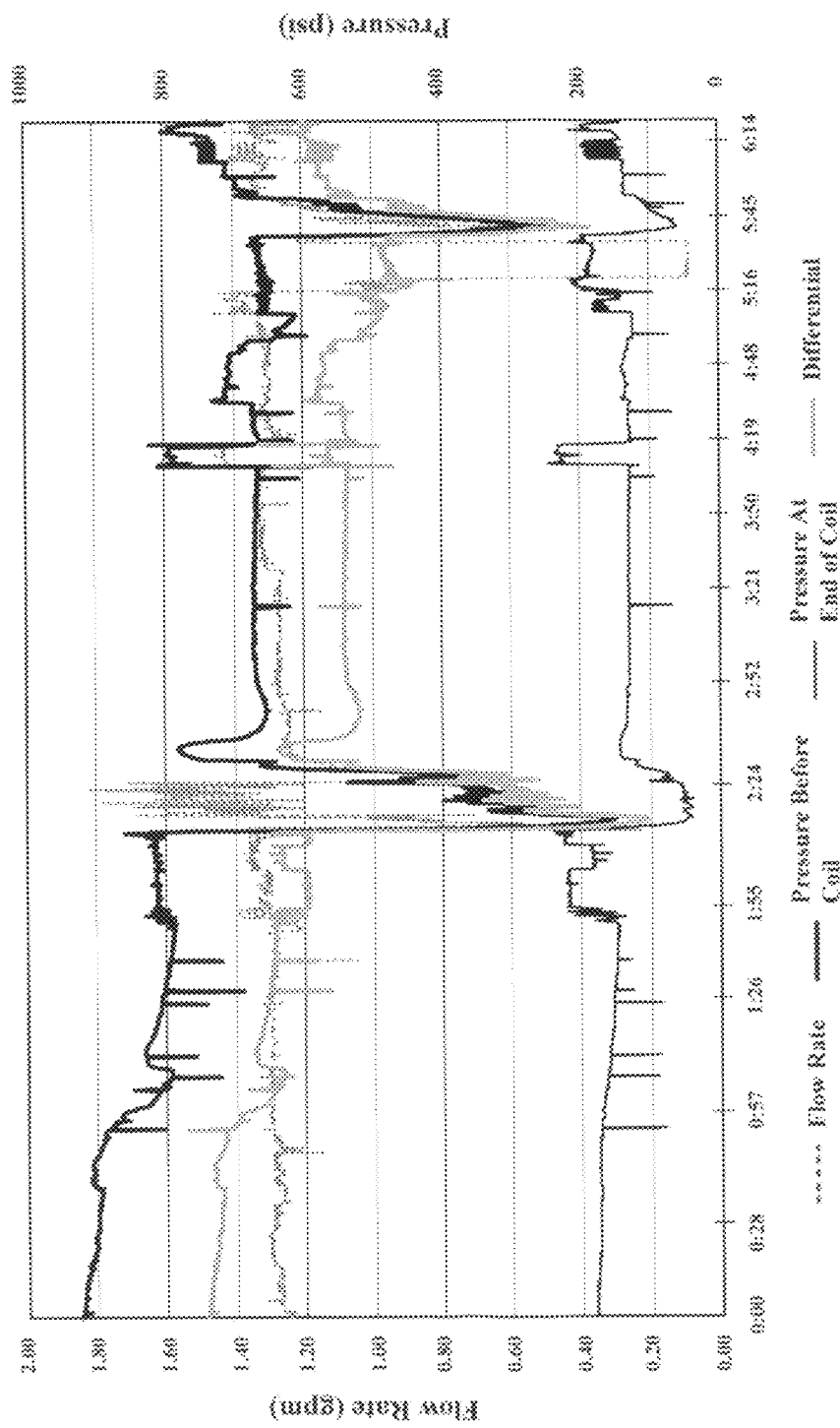
FIG. 1 depicts data from a flow loop test of a fluid of this invention to demonstrate its pumpability and foamability.

The inventors have found that an improved foaming composition for oil-based drilling fluids can be prepared from a hydrocarbon fluid and a foaming composition, where the foaming composition includes a polymer or a gelling agent and a cross-linking agent, or mixtures or combinations thereof. The inventors also have found that viscosifying the base fluid with a hydrocarbon viscosifying agent followed by the addition of a gas such as air, nitrogen, membrane nitrogen, other nitrogen/oxygen gas mixtures, carbon dioxide, an inert gas, methane, natural gas, exhaust gas, flue gas or other similar gases or mixture thereof, produces pre-foam fluid capable of producing a stable drilling fluid foam, where the foam stability is measured by foam height and/or half-life. The foam and viscosity generated by drilling fluids including a foaming compositions of this invention can be recycled (foam/defoam—closed system) more than 10 times with minimal addition of additional foaming composition or components thereof making the technology very economical. The foaming compositions of this invention are ideally suited for drilling operations, especially under-balanced or managed pressure drilling operations, recyclable drilling operations, coiled tubing drilling operations and clean out operations, capillary coiled tubing (CCT) (foaming CCT production) operations, foam operations, recyclable foam drilling operations, well intervention operations, well clean out operations, fracture/stimulation operations (proppant transport), foamed treatment of pipelines to reduce pig sticking during cleaning or testing, and/or similar operations. In under-balanced drilling operations, the drilling fluid including the foaming agent of this invention allows a fluid hydrostatic head pressure of the fluid in the well to be reduced below that of a formation pressure or at that of the formation pressure by forming a foam that is then broken at the top of the well so that the well fluids and gas can be separated (defoaming) and the well fluids refoamed and recycled, for continued operations.

The present invention broadly relates to a pre-foam hydrocarbon drilling fluid composition including a hydrocarbon base fluid, an effective amount of a foaming composition of this invention and a gasifying amount of a gas, where the effective amount of the foaming composition is sufficient to produce a hydrocarbon foam and the aerating amount of the gas is sufficient to produce the pre-foam capable of generating the hydrocarbon foam when the pre-form or gasified fluid is disrupted. The foaming composition includes a polymer, and/or a cross-linkable composition, and an optionally a foaming agent. The cross-linkable composition includes a gelling agent and a cross-linking, where the cross-linking agent is present in a concentration sufficient to produce a desired viscosity of the drilling fluid by cross-linking the gelling agent.

The present invention broadly relates to a method for producing a stable foam from a hydrocarbon drilling fluid including the step of adding an effective amount of a foaming composition of this invention to the drilling fluid, where the effective amount is sufficient to produce a more stable foam when a gas is injected into the fluid. After adding the foaming composition, a gas is injected into the fluid to produce a more stable hydrocarbon drilling fluid foam, where the foam decreases the column weight and is capable of being broken and refoamed repeatedly with little addition of refoaming additives or makeup foaming composition. The method also includes the step of adding a defoamer to the foam to break the foam after the foam exits a borehole of a well. The method can also include the step of recirculating the drilling fluid including the foaming composition into the borehole of the well and injecting gas under conditions sufficient to reform the drilling fluid foam. The method can also include the step of adding an additive effective amount of a foam enhancing agent to and/or of adding a makeup effective amount of the foaming compositions to improve refoaming characteristics. The term foam enhancing agent can be a component of the foaming compositions or an additive that will augment the fluid characteristic in a desired manner such as making the fluid more tolerant to lower or higher temperatures or to augment another desire property without adversely affecting the foamability of the fluid.

The present invention broadly relates to a foaming composition for hydrocarbon based drilling fluids including a hydrocarbon based drilling fluid and an effective amount of a foaming composition of this invention, where the effective amount is sufficient to produce a hydrocarbon drilling fluid foam. The foaming composition includes a polymer, and/or a cross-linkable composition, and an optionally a foaming agent. The cross-linkable composition includes a gelling agent and a cross-linking, where the cross-linking agent is present in a concentration sufficient to produce a desired viscosity of the drilling fluid by cross-linking the gelling agent.

The drilling fluid system is capable of being recycled (foam/defoam/foam/etc.) by reducing the foam height or breaking the foam through the addition of a deformer such as isopropyl alcohol (IPA) or methanol or mixtures of low molecular weight alcohols, cellosolves, esters or the like, low molecular weight paraffinic hydrocarbons or mixtures or combinations thereof at a rate of 0.5 vol. % based on a volume of the fluid. The fluid can be foamed and defoamed up to 10 times or more without the addition of more foaming composition and/or components thereof making the drilling fluid system of this invention very economical. Of course, during each recycle, additional amounts of the foaming composition or components thereof may be added.

The foaming compositions of this invention generate foams in hydrocarbon drilling fluids having a half life (the time is takes for 50% foam decay as measured in a graduated cylinder) of greater than 5 minutes, which generally exceed connection times, and, therefore, should be ideal for horizontal drilling. Thus, the fluid will remain either in a foam state or a pre-foam state throughout an operation requiring a drill string disconnection.

The present invention also broadly relates to fluid composition comprising a hydrocarbon base-fluid, a foaming agent and an amount of a dissolved gas, where the amount of gas is sufficient to convert the fluid into a light weight fluid having a weight between about 0.75 and about 0.25 of the weight of the base fluid or to produce a foam having a foam height between about 150 mL and about 700 mL based on 100 mL of the fluid. Such hydrocarbon fluids are ideally suited for under-balanced drilling.

For the purpose of this invention, a two-phase drilling fluid is a drilling system where a compressed gas such as air, nitrogen, carbon dioxide, or mixtures or combinations thereof is injected into a drilling fluid in the absence of a foamer. A single-phase drilling fluid is a drilling system where a compressed gas such as air, nitrogen, carbon dioxide, or mixtures or combinations thereof is injected into a drilling fluid in the presence of a foamer or a viscosifying agent that creates a stable foam—a drilling foam. However, generally, the use of single-phase drilling fluids has required specialized equipment at the floor of the drilling platform to permit the injection of the compressed gas downstream of the fluid pumps to prevent pump cavitation or vapor locking.

Unlike traditional fluids, the pre-foam compositions of this invention are formed by aerating or gasifying the hydrocarbon drilling fluids prior to use. The resulting aerated or gasified fluid is stable in its aerated/gasified form until it is disrupted. The disruption can be as simple as pouring the aerated/gasified fluid from one container to another. In drilling operations, the pre-foam is produced and pumped into a drill string, because the fluid can be pumped using traditional pumps without having cavitation problems that generally are encountered when trying to pump fluids that have entrained gas. Once a pressure drop is realized or the pressure is reduced, a portion of the gas is released from the fluid. This action transforms the fluid into a foam and re-compression returns the foam back into a liquid or semi-liquid state. The liquid or semi-liquid will remain in this state until the fluid is disrupted such as by passing the fluid or semi-fluid through a drill bit to generate a foam or undergoing any other type of pressure reduction event, especially a pressure reduction event accompanied by shearing. As a result, the liquid or semi-liquid fluid, which includes sufficient absorbed or dissolved gas to produce stable foam, is convertible upon disruption into a fluid that possesses the same low density properties as a foam, but in a fluid state. The inventors have also found that the resulting aerated/gasified fluid once disrupted has a much lower weight per gallon that the fluid prior to disruption. Thus, a starting fluid weighting of 7 lbs/gal can be aerated/gasified to a pre-foam that upon disruption is converted to a fluid or fluid foam having a weight as low as 2 lbs/gal, but generally between about 5 lbs/gal to about 2 lbs/gal . Thus, the pre-foam compositions of this invention not only produce a low pressure in the well bore for use in under-balanced or managed pressure drilling, but also a lower the column weight of the fluid in the drill string. Because the pre-foam is stable until disrupted, the drill string can be disconnected without loss of the pre-foam properties or loss of entrained or held gas at least for the duration of a general disconnect, about 10 to 20 minutes. Of course, one of ordinary skill will understand that the pre-foam is not infinitely stable and will degas over time.

The hydrocarbon drilling fluids of this invention possess the capacity to entrain gas at any point along fluid injection system and to solubilize the gas within the fluid. The amount of solubilized gas is of course depend on various facts such as the gas used, the contact time, the contact pressure, the contact volume and/or the contract temperature, with volume, temperature and pressure related as is well known in scientific community. The absorption and solubilization process increase the energy of fluid as it now includes the dissolved gas. At the point of a pressure reduction with or without shear such as when the fluid exits a drill bit at the end of a drill string, the stored energy and solubilized gas will be released to form gas bubbles int the fluid resulting in the formation of a foam, which further lightening the fluid. The viscosifying agents in the fluid further enhance the foam's ability to entrain and carry cuttings and stabilize the light drilling fluid. The viscosifying agents also increase the ability for the fluid to absorb and retain a gas, i.e., improves the gas capturing ability of the fluid, and stabilize the gas bubbles after the fluid undergoes a pressure reduction in the absence or presence of a shearing event, sufficient to transition the fluid from a gasified fluid to a foamed fluid or a foam. The viscosifying agents also increase the relative viscosity of the fluid before and after the fluid transitions into a fluid foam. Thus, the additive composition of this invention converts the hydrocarbon base from a low gas reservoiring fluid to a high gas reservioring fluid. That is, the additive composition of this invention greatly increases a gases solubility in the hydrocarbon base fluid. The increased gas solubility permits sufficient gas to be absorbed in the fluid so that the fluid can be pumped into a drill string, yet upon undergoing a disruptive event, the fluid is converted spontaneously into a foam. The gasified drilling fluid, which may have a density similar to the fluid in the absence of the absorbed gas, converts to a light weight drilling fluid in situ upon undergoing a pressure reduction, especially in a shearing environment such as exiting a drill bit or at any point where a pressure reduction is accompanied by shearing force. The gasified drilling fluid of this invention are in that sense smart fluids in that they change their properties in response to a change in the environment and the degree of change can be designed into the fluid by controlling the fluid compositions, the fluid temperature and pressure, the absorbed gas, and the nature of the disruption event.

Suitable Drilling Fluid Components

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5 \times 10^{-6}$ to about $600 \times 10^{-6}$ m²/s (5 to about 600 centistokes). Exemplary examples of such hydrocarbon fluids include, without limitation, polyalphaolefins, polybutenes, polyolesters, biodiesels, simple low molecular weight fatty esters of vegetable or vegetable oil fractions, simple esters of alcohols such as Exxate from Exxon Chemicals, vegetable oils, animal oils or esters, other essential oil, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Linpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5 \times 10^{-6}$ to about $600 \times 10^{-6}$ m²/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet and hydrogenated oils such as HT-40N and IA-35 from Petro-Canada or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Suitable foaming agents for use in this invention include, without limitation, any foaming agent suitable for foaming hydrocarbon based drilling fluids. Exemplary examples of foaming agents include, without limitation, silicone foaming agents such as tetra(trimethylsiloxy)silane or polysiloxanes, fluorinated oligomeric or polymeric foaming agents such as fluorinated methacrylic copolymer or other fluorosurfactants, or other similar foaming agents capable of producing a foam in a hydrocarbon or oil-based drilling fluid or mixtures or combinations thereof. Exemplary examples of such foaming agents include, without limitation, DC-1250, DC-193, or other DC foamers available from Dow Corning, Zonyl FSG available from DuPont, Silwet (polyaklylene oxide modified dimethylpolysiloxanes) from Witco and Union Carbide, APFS-16 available from Applied Polymer, A4851 available from Baker Petrolite, Paratene HFA available from Woodrising, JBR200, JBR300, JBR400, and JBR500 available from Jeneil Biosurfactant Company, Paratene HFA, Paratene HFB, Paratene MFA, Paratene MFB available from Woodrising Resources Ltd. or mixture or combinations.

Suitable polymers for use in this invention include, without limitation, any polymer soluble in the hydrocarbon base fluid. Exemplary polymers include, without limitation, a polymer comprising units of one or more (one, two, three, four, five, . . . , as many as desired) polymerizable mono-olefms or di-olefins. Exemplary examples includes, without limitation, polyethylene, polypropylene, polybutylene, or other poly-alpha-olefins, polystyrene or the polyaromatic olefins, polybutadiene, polyisoprene, or other poly-diolefins, or copolymers (a polymer including two or more mono-olefins or di-olefins) or copolymers including minor amount of other co-polymerizable monomers such as acrylates (acrylic acid, methyl acrylate, ethyl acrylate, etc.), methacrylates (methacrylic acid, methyl methacrylate, ethyl methacrylate, etc), vinylacetate, maleic anhydride, succinic anhydride, or the like, provided of course that the resulting polymer is soluble in the hydrocarbon base fluid.

Suitable gelling agents for use in this invention include, without limitation, any gelling agent. Exemplary gelling agents includes phosphate esters, ethylene-acrylic acid copolymer, ethylene-methacrylic acid copolymers, ethylene-vinyl acetate copolymers, ethylene-maleic anhydride copolymers, butadiene-methacrylic acid copolymers, ethylene-methacrylic acid copolymers, styrene-butadiene-acrylic acid copolymers, styrene-butadiene-methacrylic acid copolymers, or other copolymer including monomers having acid moieties or mixtures or combinations thereof. Exemplary examples phosphate ester gelling agents include, without limitation, WEC HGA 37, WEC HGA 70, WEC HGA 71, WEC HGA 72, WEC HGA 702 or mixtures or combinations thereof, available from Weatherford International iso-octyl, 2-ethylhexyl, phosphate esters or other phosphate esters from P-2, and similar phosphonate esters of high molecular weight alcohols available from Halliburton or mixtures or combinations thereof. Other suitable gelling agents include, without limitation, Geltone II available from Baroid, Ken-Gel available from Inco or the like.

Suitable cross-linking agent for use in this invention include, without limitation, any suitable cross-linking agent for use with the gelling agents. Exemplary cross-linking agents include, without limitation, di-, tri or tetra-valent metal salts such as calcium salts, magnesium salts, cerium salts, barium salts, copper (copprous and cupric) salts, cobalt salts, chromium salts, manganese salts, titanium salts, iron salts (ferrous and ferric), zinc salts, zirconium salts, aluminum salts, any other transition metal, actinide metal or lanthanide metal salt capable of acting as a phosphate ester cross-linking agent or mixtures or combinations thereof. Exemplary examples cross-linking agent for use with phosphate esters include, without limitation, WEC HGA 44, WEC HGA 48, WEC HGA 55se, WEC HGA 55s, WEC HGA 61, WEC HGA 65 or mixtures or combinations thereof available from Weatherford International.

Suitable defoaming agents for use in this invention include, without limitation, any defoaming agent capable of reducing the foam height of the foamed drilling fluid systems of this invention. Exemplary examples of defoaming agents are low molecular weight alcohols with isopropanol or isopropyl alcohol (IPA), methanol or mixtures of low molecular weight alcohols, cellosolves, esters or the like, low molecular weight paraffinic hydrocarbons or mixtures or combinations thereof.

Compositional Ranges

The foamable hydrocarbon drilling fluids compositions of this invention are defined on a volume percent (vol % or vol. %) basis based on 100 mL of a hydrocarbon base fluid. The foam composition is added to the hydrocarbon base fluid in an amount sufficient to achieve a desired foam height and foam half life.

Generally, the foaming composition is added to the hydrocarbon based fluid in a volume percent (vol. %) ranging between about 0.05 vol. % and about 5.0 vol. %. In one embodiment, the foaming composition is added to the hydrocarbon base fluid in a volume percent (vol. %) ranging between about 0.75 vol. % and about 2.5 vol. %. In another embodiment, the foaming composition is added to the hydrocarbon base fluid in a volume percent (vol. %) ranging between about 0.10 vol. % and about 1.0 vol. %.

If used, the foaming agent is generally added to the hydrocarbon base fluid in a volume percent (vol. %) ranging between about 0.05 vol. % and about 5.0 vol. %. In one embodiment, the foaming agent is added to the hydrocarbon base fluid in a volume percent (vol. %) ranging between about 0.75 vol. % and about 2.5 vol. %. In another embodiment, the foaming agent is added to the hydrocarbon base fluid in a volume percent (vol. %) ranging between about 0.10 vol. % and about 1.0 vol. %.

Generally, the polymer is added to the hydrocarbon based fluid in a volume percent (vol. %) ranging between about 0.05 and about 5.0 vol. %. In another embodiment, the gelling agent is added to the hydrocarbon base fluid in a volume percent (vol. %) ranging between about 0.75 vol. % and about 2.5 vol. %. In another embodiment, the gelling agent is added to the hydrocarbon base fluid in a volume percent (vol. %) ranging between about 0.10 vol. % and about 1.0 vol. %.

Generally, the gelling agent is added to the hydrocarbon based fluid in a volume percent (vol. %) ranging between about 0.05 and about 5.0 vol. %. In another embodiment, the gelling agent is added to the hydrocarbon base fluid in a volume percent (vol. %) ranging between about 0.75 vol. % and about 2.5 vol. %. In another embodiment, the gelling agent is added to the hydrocarbon base fluid in a volume percent (vol. %) ranging between about 0.10 vol. % and about 1.0 vol. %.

Generally, the cross-linking agent is added to the hydrocarbon based fluid just before use in a volume percent (vol. %) ranging between about 0.005 and about 0.5 vol. %. In another embodiment, the cross-linking agent is added to the hydrocarbon base fluid in a volume percent (vol. %) ranging between about 0.01 vol. % and about 0.25 vol. %. In another embodiment, the cross-linking agent is added to the hydrocarbon base fluid in a volume percent (vol. %) ranging between about 0.05 vol. % and about 0.2 vol. %. In another embodiment, the cross-linking agent is added to the hydrocarbon base fluid in a volume percent (vol. %) below about 0.2 vol. %. In certain embodiments, the cross-linking agent can be added to the fluid along with the gelling agent prior to use, but adding the gelling agent and the cross-linking agent results in a viscosity increase that can render transportation more costly. Of course, the cross-linking agent can be added to the fluid in the absence to the gelling agent and the gelling agent added just prior to use.

When using a foaming composition including a gelling agent and its cross-linking agent, the two components are generally not added to the fluid until the fluid is to be used to maintain the fluid in a low viscosity state until use. However, the fluid can be pre-made with one, but not both of the agents present. Of course, if viscosity is not an issue during transportation, both agents can be added together. For compositions including a foaming agent and the gelling agent and its cross-linking agent, the foaming agent can be added at any time, but generally the gelling agent and its cross-linking agent are not added together until use, with the same provisos as set forth above. For polymer viscosified fluids, the polymer can be added at any time depending on viscosity requirements during transportation or the user prerogative.

Generally, the amount of defoaming agent added to the foamed drilling fluid systems of this invention is a vol. % amount sufficient to break the foam. In one embodiment, the defoaming vol. % ranges from about 0.05 vol. % to about 5 vol. %. In another embodiment, the defoaming vol. % ranges from about 0.1 vol. % to about 2.5 vol. %. In another embodiment, the defoaming vol. % ranges from about 0.1 vol. % to about 1.0 vol. %. In another embodiment, the defoaming vol. % ranges from about 0.25 vol. % to about 0.5 vol. %.

Foam Characteristics

Generally, the foamable hydrocarbon drilling fluid systems of this invention from an initial fluid amount of 100 mL, will produce a foam having a foam height of at least 150 mL and a half life of at least 2 minutes. In certain embodiments, the produced foam will have a foam height between about least 150 mL and about 700 mL and a half life between about 2 minutes and 20 minutes depending on the application and the exact formulation of the hydrocarbon fluid of this invention. The stability or half life and foam height of the produced foam is controlled by the amount and type of the viscosifying agents in the composition, by the amount and type of the foaming agents in the composition, by the amount of gas and type of gas in the composition, by the temperature of the composition and by the pressure of the composition. Generally, increasing the amount of the viscosifying agents and/or foaming agents, the foam stability and height can be increase. Generally, the viscosifying agents increase the stability more than the foam height, while the foaming agents increase the foam height. Of course, the foam height is also directly proportional to the amount and type of gas dissolved or absorbed in the fluid.

In certain embodiments, the foaming composition is added to the hydrocarbon base fluid in an amount sufficient to produce a foamable hydrocarbon drilling fluid capable of producing a foam having a foam height between about 150 mL and about 700 mL or more and having a half life between about 2 minutes and about 20 minutes or more.

In one embodiment, the foaming composition is added to the hydrocarbon base fluid in an amount sufficient to produce a foamable hydrocarbon drilling fluid capable of producing a foam having a foam height of at least 150 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 150 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 200 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 200 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 250 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 250 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 300 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 300 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 350 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 350 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 400 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 400 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 450 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 450 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 500 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 500 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 550 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 550 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 600 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 600 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 650 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 650 mL and a foam half life between about 3 and about 20 minutes.

In another embodiment, the foaming composition is added to the hydrocarbon base fluid in an amount sufficient to produce a foamable hydrocarbon drilling fluid capable of producing a foam having a foam height of at least 700 mL and a foam half life of at least 3 minutes. In another embodiment, the foaming composition is added to the hydrocarbon base fluid in an amount sufficient to produce a foamable hydrocarbon drilling fluid capable of producing a foam having a foam height of at least 700 mL and a foam half life between about 3 and about 20 minutes.

EXPERIMENTS OF THE INVENTION

Foam Test

Foam test used a Lab Hamilton Beach Malt Mixer. The mix procedure was to mix the test drilling fluids at high speed for 45 seconds to 60 seconds and noting any change at 15 second intervals. Foaming concentration tested are as set forth herein. After foaming on the mixer, the test drilling fluids were poured into either a 1,000 mL of 500 mL graduated cylinder to determine if the foam measurement were linear. The foam height represented the mL occupied by the foam after the foam was poured into the cylinder. The half life represents the time it takes a foam having an initial foam volume to decay by 50% of that original foam volume, e.g., if the initial foam volume is 500 mL as measured in a 1000 mL graduated cylinder, then the half life is the time is takes for the foam volume to reduce to a value of 250 mL.

EXAMPLE 1

This example illustrates the preparation of an illustrative example of a diluted cross-linking agent of this invention, which is then used in all of the subsequent formulations.

A cross-linking solution was prepared by adding 90 wt % of monoethylene glycol and 10 wt. % of WEC HGA-65, a ferric cross-linking agent, available from Weatherford International.

EXAMPLE 2

This example illustrates the preparation and testing of an illustrative example of foaming composition of this invention for foaming an oil-based drilling fluid including a foaming agent, a gelling agent and a cross-linking agent.

To 100 mL of "Off Road" Red Diesel #2 high sulfur content, 0.2 vol. % of HGA 70, a phosphate ester hydrocarbon gelling agent available form Weatherford International, and 0.5 vol. % of the solution of Example 1 were added. The resulting solution was mixed for 1 minute on Hamilton Beach Mixer at the highest speed. This solution was found to generate a foam having a foam height of 150 mL as measured in a graduated cylinder and a half life of 2:40 minutes.

To the above solution was added 0.5 vol. % of DC-1250, a foaming agent available from Dow Corning, and the resulting solution was mixed for 1 minute on Hamilton Beach Mixer at the highest speed. The solution was found to generate a foam having a foam height of 170 mL and a half life of 5:15 minutes.

To the solution was added 10 vol. % crude oil as a contaminant. The crude oil contaminated solution was mixed for 1 minute on Hamilton Beach Mixer at the highest speed. The crude oil contaminated solution was found to generate a foam having a foam height of 180 mL and a half life of 2:00 minutes.

To the crude oil contaminated solution was added 0.5 vol. % DC-1250. The solution was mixed for 1 minute on Hamilton Beach Mixer at the highest speed. The solution output was found to generate a foam having a foam height of 185 mL and a half life of 2:00 minutes.

Thus, crude oil contamination of the drilling fluid is detrimental to foam stability decreasing its half life from greater than 5 minutes to about 2 minutes.

EXAMPLE 3

This example illustrates the preparation and testing of another illustrative example of a foaming composition of this invention for foaming an oil-based drilling fluid.

To 100 mL "OffRoad" Red Diesel #2, 0.2 vol. % HGA 70, a phosphate ester gelling agent available from Weatherford International, and 0.5 vol. % of the cross-linking solution of Example 1 were added. The solution was mixed for 1 minute on Hamilton Beach Mixer at the highest speed. To this solution was added 0.5 vol. % Zonyl FSG, a foaming agent available from DuPont with mixing for 1 minute on Hamilton Beach Mixer at the highest speed. The foamed solution had a foam height of 170 mL and a half life of 6:00 minutes.

To this solution was added 10 vol. % of crude oil as a contaminant with mixing for 1 minute on Hamilton Beach Mixer at the highest speed to produce a foam having a foam height of 180 mL with a half life of 2:00 minutes.

From Examples 2 and 3, the addition of crude oil to the drilling fluid decrease foam stability as measure by foam half life. Thus, when using oil based drilling fluids where the risk of crude oil contamination is high will require an increase in the relative concentration of the gelling agent and the cross-linking agent and possibly the foaming agent. In formulation terms, the foaming compositions of this invention for use in crude oil contaminated drilling fluid should be formulated with higher concentrations of the gelling agent and cross-linking agents. Generally, the vol. % for this purpose should be in the range between about 0.5 vol. % and about 5 vol. % gelling agent and between about 0.1 vol. % and about 0.5 vol. % cross-linking agent.

EXAMPLE 4

This example illustrates the preparation and testing of another illustrative example of a foaming composition of this invention for foaming an oil-based drilling fluid.

To 100 mL "Off Road" Red Diesel #2, 0.5 vol. % HGA 70, phosphate ester gelling agent available from Weatherford International, and 0.5 vol. % of the cross-linking solution of Example 1 were added with mixing for 1 minute on Hamilton Beach Mixer at the highest steep. To this solution was added 0.5 vol. % of DC-1250, a foaming agent available from Dow Corning with mixing for 1 minute on Hamilton Beach Mixer at the highest speed producing a foam having a foam height of 160 mL and a half life of 4:10 minutes.

To this foamable drilling fluid was added 10 vol. % of crude oil as a contamination with mixing for 1 minute on Hamilton Beach Mixer at the highest speed to form a foam having a foam height of 170 mL and half life of 2:00 minutes.

To this oil contaminated drilling fluid were added 0.5 vol. % HGA 70 phosphate ester and 0.5 vol. % of the cross-linking solution of Example 1 mixing for 1 minute on Hamilton Beach Mixer at the highest speed to produce a foam having a foam height of 160 mL and a half life of 3:00 minutes.

To this drilling fluid was added 10 vol. % of field brine (water) as another source of contamination mixing for 1 minute on Hamilton Beach Mixer at the highest speed to produce a foam having a foam height of 170 mL and a half life of 5:00 minutes.

Thus, the addition of additional gelling agent and cross-linking agent increases half life as does the addition of water with formation of only a weak emulsion.

EXAMPLE 5

The following examples illustration the aeration of 1500 mL of diesel #2 (red) were placed in a Hamilton Beach and mixed. 0.5% (v/v) of HGA 70 available from Clearwater International, Inc. and 0.5% (v/v) of the solution of Example 1 were added with mixing to the diesel. The resulting fluid, which is referred to as Diesel Gel, was mixed for 1 hour at medium speed. 250 mL of the resulting Diesel Gel were pour into 500 mL pressure cell. In those formulations that include a roamer, the indicated amount of DC-1250 foamer was added to the cell before pressurization, which results in a 250 mL air gap in the cell. The cell was pressurized to 300 psi with test gas. The cell is left under static conditions for 16 hours at ambient temperature. The cell was then depressurized and the aerated fluid was poured into 1000 mL graduate cylinder and the foam height (FH) and half life (HL) were measured. The results of the tests are tabulated in Table I.

TABLE I

Aerated Fluid Foam Data

| Test | System | Gas | FH | HL | Density |
|---|---|---|---|---|---|
| 1 | 250 mL Diesel Gel | MN† | 550 | 6:00 | 2.3 |
| 2 | 250 mL Diesel Gel + .25% DC1250 | MN | 480 | 13:30 | 3.0 |
| 3 | 250 mL Diesel + .25% DC1250 | MN | 580 | 3:03 | 2.1 |
| 4 | 250 mL Diesel Gel | $N_2$‡ | 520 | 4:00 | 2.6 |
| 5 | 250 mL Diesel Gel + .25% DC1250 | $N_2$ | 460 | 7:38 | 3.3 |
| 6 | 250 mL Diesel + .25% DC1250 | $N_2$ | 370 | 0:30 | 5.8 |
| 7* | 250 mL Diesel Gel | Air†† | 400 | 0:17 | 4.7 |
| 8 | 250 mL Diesel Gel + .25% DC1250 | Air | 550 | 12:16 | 2.3 |
| 9 | 250 ml Diesel + .25% DC1250 | Air | 650 | 3:45 | 1.8 |

*Gel at the bottom of the container-no viscosity

†MN is membrane nitrogen, which is 96% nitrogen with 4% residual oxygen

‡$N_2$ is 99.9999% nitrogen

††Air is compressed air

The data clearly shows that the fluid including the gelling agent and its cross-linking agent to hold gas and spontaneously convert to a stable foam after a disruptive event.

EXAMPLE 6

This example illustrates the gasification of a fluid of this invention including a gelling agent and its cross-linking agent.

To 250 mL of "Off Road" Red Diesel #2 having a high sulfur content, 0.5 vol. % of HGA 70, a phosphate ester hydrocarbon gelling agent available from Weatherford International, and 0.5 vol. % of the solution of Example 1 were added. The resulting solution was then placed in a 500 mL pressure cell. The pressure cell was sealed and the cell was pressurized to 300 psi with membrane nitrogen (96% nitrogen, 4% oxygen) and left at that pressure for 15 minutes. The pressure in the cell was then relieved to produce a gasified fluid having substantially the same volume. The density of the fluid before and after pressurization is substantially the same as diesel, which is about 7 lbs/gal. A stirring rod was then placed in the fluid and the fluid was stirred by the rod one time in a clockwise fashion. The resulting disruptive event causes the fluid to transition to a foam in approximately 1 second. The foam expanded to the top of the 500 mL cell, essentially doubling its volume. Thus, the original 7 lbs/gal fluid, upon gentle agitation, was spontaneously converted (within approximately a second) to a 3.5 lbs/gal fluid foam. Prior to stirring, the fluid showed signs of a slow out-gassing of the dissolved or absorbed gas.

EXAMPLE 7

This example illustrates the preparation and ambient temperature recycle testing of another illustrative example of a foaming composition of this invention for foaming an oil-based drilling fluid.

First Foam/Defoam Cycle

To 100 mL of crude oil from the Comanche Resources Andrews field #23-1 Dewey County, OK were added 1 vol. % HGA 37, a gelling agent, 0.05 vol. % HGA65, a cross-linking agent, and 0.50 vol. % Zonyl FSG, a foaming agent, with mixing for 1 minute on Hamilton Beach Mixer at the highest speed to produce a foam having a foam height of 140 mL and a half life of 3:40 minutes.

To this foam was added 0.5 mL of IPA, a defoaming agent to break the foam.

Second Foam/Defoam Cycle

The broken foam from the first foam/defoam cycle was then mixed for 1 minute on Hamilton Beach Mixer at the highest speed to produce a foam having a foam height of 138 mL and half life of 4:00 minutes.

To this foam was added 0.5 mL IPA, a defoaming agent to break the foam.

Third Foam/Defoam Cycle

The broken foam from the second foam/defoam cycle was then mixed for 1 minute on Hamilton Beach Mixer at the highest speed to produce a foam having a foam height of 138 mL and a half life 6:00 minutes.

To this foam was added 0.5 mL EPA, a defoaming agent to break the foam.

Fourth Foam/Defoam Cycle

The broken foam from the third foam/defoam cycle was then mixed for 1 minute on Hamilton Beach Mixer at the highest speed to produce a foam having a foam height of 130 mL and a half life 8:00 minutes.

To this foam was added 0.5 mL IPA, a defoaming agent to break the foam.

Fifth Foam/Defoam Cycle

The broken foam from the fourth foam/defoam cycle was then mixed for 1 minute on Hamilton Beach Mixer at the highest speed to produce a foam having a foam height of 122 mL and a half life 8:40 minutes.

To this foam was added 0.5 mL EPA, a defoaming agent to break the foam.

Sixth Foam/Defoam Cycle

The broken foam from the fifth foam/defoam cycle was then mixed for 1 minute on Hamilton Beach Mixer at the highest speed to produce a foam having a foam height of 118 mL and a half life 9:00 minutes.

To this foam was added 0.5 mL IPA, a defoaming agent to break the foam.

Seventh Foam/Defoam Cycle

The broken foam from the sixth foam/defoam cycle was then mixed for 1 minute on Hamilton Beach Mixer at the highest speed to produce a foam having a foam height of 116 mL and a half life 10:00 minutes.

To this foam was added 0.5 mL IPA, a defoaming agent to break the foam.

Eighth Cycle Foam/Defoam Cycle

The broken foam from the seventh foam/defoam cycle was then mixed for 1 minute on Hamilton Beach Mixer at the highest speed to produce a foam having a foam height of 110 mL and a half life of 12:00 minutes.

Thus, the foaming compositions of this invention are capable of foaming a hydrocarbon drilling fluid system over many foam/defoam cycles without loss in foam stability. In fact, the foam appears to get more stable after each cycle, but is still capable of being broken by the addition of the defoaming agent.

EXAMPLE 8

This example illustrates the preparation and testing of an oil-based drilling fluid including a polymeric viscosifying agent in particular an SEPS Kraton Polymer (Styrene-Ethylene/Propylene -Styrene Block Copolymer) available from Kraton Polymer of Houston, Tex.

To 350 mL of Drillsolv Plus supplied by Enerchem (straight run distillate), 10 grams of the Kraton polymer were added with mixing using a Silverson Mixer running at 5000 RPM for 30 seconds to dissolve the polymer. 100 mL of polymer modified Drillsolv Plus were placed in a Hamilton Beach Mixer and mixed at high shear with for 1 minute. The resulting foam had a foam height of 150 mL and a half life of 2 minute and corresponded to a drilling fluid having 4.7 lb/gal fluid of the polymeric viscosifying agent.

EXAMPLE 9

This example illustrates the preparation and testing of an oil-based drilling fluid including a polymeric viscosifying agent in particular an SEPS Kraton Polymer (Styrene-Ethylene/Propylene -Styrene Block Copolymer) available from Kraton Polymer of Houston, Tex.

Based on the process of Example 6, a 3.0 lb/gal drilling fluid was prepared. 100 mL of 3.0 lb/gal drilling fluid were place in a pressurized aging cell. The cell was pressurized to 400 psi with compressed air for 5 minutes at ambient temperature. The cell was then depressurized to produce an aerated drilling fluid having very little foam, approximately 5-10 mL of foam on top of the liquid (5-10% v/v). The aerated drilling fluid was then poured into a 250 mL graduated cylinder, which disrupted the fluid producing a foam having a foam height of 230 mL and a half life of 4.5 minutes.

EXAMPLE 10

This examples illustrates the circulation of a diesel fluid of this invention containing a gelling agent and its cross-linking agent through a closed loop to demonstrate the pump ability of the fluid and its in situ gasification.

Circulation was initiated with a diesel #2 fluid. At zero time, recording was started and 0.5 vol. % of HGA-70, a gelling agent, was added to the diesel fluid. At t=0:22, 0.5 vol. % of the solution of Example 1 was added to the fluid over a 15 minute period. At t=0:47, air from a compressor (6 SCFM) was injected, but produced no bubbles and it was determined that a different air injection method was needed. At t=1:12, air from an air cylinder having a pressure of about 880 psi was used to overcome the circulation back pressure of about 830 psi. At t=1:17, the valve developed a leak and injection was discontinued to stop the leak. At t=1:33, air injection was re-established and bubbles were seen in the sight glass. At t=1:55, 0.5 vol. % of DC-1250, a hydrocarbon foamer, was added to the fluid. At t=2:06, a majority of fluid/foam was in flow over drum, and the loop was nearly empty. The test was stopped so that fluid could be pump back into the loop. At t=2:06-4:05, the fluid was continuously circulated, while heating to a temperature of 200° F. At t=4:05, air injection from the cylinder was started and a foam was observed in the sight glass. At t=4:07, a sample of the fluid was taken and had a density of 5.3 lb/gal. At t=4:13, air injection was turned off and another sample was taken that had a density of 4.2 lb/gal. At t=4:25, 0.5 vol. % of HGA-70 and 0.5 vol. % of the solution of Example 1 were added to the fluid over an 18 minute period of time. At t=4:36, the fluid in flow was transferred over the drum back into loop. At t=4:51, another sample was taken that had a density of 5.2 lb/gal. At t=4:59, air injection from the cylinder was started at an injection pressure of 650 psi injection and a foam appeared in the sight glass. At t=5:01, another sample of the fluid was taken that had a density of 3.7 lb/gal. At t=5:13, another sample was taken that had a density of 3.8 lb/gal and a foam half life in the sight glass of greater than 17 minutes. At t=5:30, air injection was stated due to foam coming out of the flow over drum depleting the fluid in the loop. At t=5:31, 2.5 vol. % of of isopropanol, a defoamer, was added. At t=6:00, air injection was restarted. At t=6:04, another sample was taken that had a density of 5.8 lbm/gal. At t6:16, hot fluid circulation was stopped ending the test. The results of the test are shown in FIG. 1. The data demonstrates that the fluid is pumpable and is capable of producing a light weight fluid when the fluid is withdrawn from the loop. Thus, unlike many foam systems that cause severe pump cavitation and locking, the fluids of this invention are capable of being gasified and pumped, while maintaining their ability to product light weight fluids after being withdrawn from a pressured environment.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for drilling a well comprising the steps of:
    adding an effective amount of a foaming composition to a hydrocarbon base fluid to form a foamable hydrocarbon drilling fluid, where the foaming composition comprises a polymer or a gelling agent and a cross-linking agent or mixtures or combinations thereof; and
    mixing the foamable hydrocarbon drilling fluid with a gas under conditions to dissolve the gas in the fluid to form a pre-foam including an amount of solubilized gas sufficient to produce a foam having a foam height of at least 150 mL and a half life of at least 2 minutes based on 100 mL of fluid, when the pre-foam undergoes a pressure drop,
    pumping the pre-foam into a drill string while drilling, where the pre-foam prevents pump cavitation or vapor locking encountered in traditional gas-liquid drilling fluid combinations,
    producing a foam when the pre-foam undergoes the pressure drop and the pressure drop is sufficient to convert the pre-foam into the foam, where the foam decreases a weight of the fluid column, increases a fluid removal rate from the well and increases removal of cuttings and other entrained materials in the foam, and
    withdrawing the foam from the well.
2. The method of claim 1, further comprising the step of:
    after the withdrawing step, breaking the foam with a sufficient amount of a defoaming agent.

3. The method of claim 2, further comprising the step of:
repeating the mixing, pumping, producing and breaking steps at least 5 times with or without adding an additional amount of the foaming composition or a component thereof.

4. The method of claim 2, further comprising the step of:
repeating the mixing, pumping, producing and breaking steps at least 10 times with or without adding an additional amount of the foaming composition or a component thereof.

5. The method of claim 1, wherein the foaming composition further comprises a foaming agent.

6. The method of claim 5, wherein the foaming agent is selected from the group consisting of silicone foaming agents, fluorinated foaming agents, and mixtures or combinations thereof.

7. The method of claim 1, wherein the gelling agent is selected from the group consisting of phosphate esters and mixtures or combinations thereof and its cross-linking agent is selected from the group consisting of di-, tri or tetra-valent metal salts selected from the group consisting of calcium salts, magnesium salts, cerium salts, barium salts, copper salts, cobalt salts, chromium salts, manganese salts, titanium salts, iron salts, zinc salts, zirconium salts, aluminum salts, other transition metal salts, actinide metal salts or lanthanide metal salts capable of acting as a phosphate ester cross-linking agent and mixtures or combinations thereof.

8. The method of claim 1, wherein the hydrocarbon base fluid is selected from the group consisting of synthetic hydrocarbon fluids, petroleum based hydrocarbon fluids, natural hydrocarbon (non-aqueous) fluids or other similar hydrocarbons or mixtures or combinations thereof.

9. The method of claim 1, wherein the hydrocarbon base fluid is selected from the group consisting of polyalphaolefins, polybutenes, polyolesters, biodiesels, simple low molecular weight fatty esters of vegetable or vegetable oil fractions, simple esters of alcohols, vegetable oils, animal oils or esters, other essential oil, diesel having a low or high sulfur content, kerosene, jet-fuel, white oils, mineral oils, mineral seal oils, hydrogenated oil, internal olefins having between about 12 and 20 carbon atoms, linear alpha olefins having between about 14 and 20 carbon atoms, polyalpha olefins having between about 12 and about 20 carbon atoms, isomerized alpha olefins having between about 12 and about 20 carbon atoms, VM&P Naptha, Linpar, parafins having between 13 and about 16 carbon atoms, and mixtures or combinations thereof.

10. The method of claim 1, wherein the polymer is a polymer comprising units of one or more polymerizable monoolefins or di-olefins, which is soluble in and increases the viscosity of the hydrocarbon base fluid.

11. The method of claim 1, wherein the foam having a foam height of between about 150 mL and about 700 mL and a half life of between about 2 minutes and about 20 minutes based on 100 mL of the fluid.

12. A method for drilling comprising the steps of:
providing a hydrocarbon drilling fluid including a hydrocarbon fluid and an effective amount of a foaming composition, where the foaming composition comprises a polymer or a gelling agent and a cross-linking agent, or mixtures or combinations thereof, where the effective amount is sufficient to convert to form a foam and where the hydrocarbon drilling fluid is capable of absorbing or dissolving a gas to form a pumpable drilling fluid without cavitating or vapor locking pumps encountered in traditional gas-liquid combinations;

injecting a gas into the drilling fluid at a rate sufficient to form a pumpable pre-foam hydrocarbon drilling fluid foam including an amount of dissolved gas, where the effective amount of the foaming composition and the amount of the dissolved gas is sufficient to convert the pumpable pre-foam hydrocarbon drilling fluid into a foam, when the pumpable pre-foam hydrocarbon drilling fluid undergoes a pressure drop sufficient to convert the pumpable pre-foam hydrocarbon drilling fluid into a foam having a foam height of at least 150 mL and a half life of at least 2 minutes based on 100 mL of the fluid;

circulating the pumpable pre-foam hydrocarbon drilling fluid in a drill string in a borehole of an oil or gas well, where the pumpable pre-foam hydrocarbon drilling fluid is converted to a foam, when the pumpable pre-foam hydrocarbon drilling fluid exits a drill bit undergoing the pressure drop, where the pumpable pre-foam hydrocarbon drilling fluid prevents cavitating or vapor locking of pumps encountered in traditional gas-liquid combinations.

13. The method of claim 12, further comprising the step of:
breaking the foam with a defoaming sufficient amount of a defoaming agent.

14. The method of claim 13, further comprising the step of:
repeating the circulating, injection and breaking steps at least 5 times with or without adding an additional amount of the foaming composition or a component thereof.

15. The method of claim 13, further comprising the step of:
repeating the circulating, injection and breaking steps at least 10 times with or without adding an additional amount of the foaming composition or a component thereof.

16. The method of claim 12, wherein the foaming composition further comprises a foaming agent.

17. The method of claim 16, wherein the foaming agent is selected from the group consisting of silicone foaming agents, fluorinated foaming agents, and mixtures or combinations thereof.

18. The method of claim 12, wherein the gelling agent is selected from the group consisting of phosphate esters and mixtures or combinations thereof and its cross-linking agent is selected from the group consisting of di-, tri or tetra-valent metal salts selected from the group consisting of calcium salts, magnesium salts, cerium salts, barium salts, copper salts, cobalt salts, chromium salts, manganese salts, titanium salts, iron salts, zinc salts, zirconium salts, aluminum salts, other transition metal salts, actinide metal salts or lanthanide metal salts capable of acting as a phosphate ester cross-linking agent and mixtures or combinations thereof.

19. The method of claim 12, wherein the hydrocarbon base fluid is selected from the group consisting of synthetic hydrocarbon fluids, petroleum based hydrocarbon fluids, natural hydrocarbon (non-aqueous) fluids or other similar hydrocarbons or mixtures or combinations thereof.

20. The method of claim 12, wherein the hydrocarbon base fluid is selected from the group consisting of polyalphaolefins, polybutenes, polyolesters, biodiesels, simple low molecular weight fatty esters of vegetable or vegetable oil fractions, simple esters of alcohols, vegetable oils, animal oils or esters, other essential oil, diesel having a low or high sulfur content, kerosene, jet-fuel, white oils, mineral oils, mineral seal oils, hydrogenated oil, internal olefins having between about 12 and 20 carbon atoms, linear alpha olefins having between about 14 and 20 carbon atoms, polyalpha olefins having between about 12 and about 20 carbon atoms, isomerized alpha olefins having between about 12 and about 20 carbon atoms, VM&P Naptha, Linpar, Parafins having between 13 and about 16 carbon atoms, and mixtures or combinations thereof.

21. The method of claim 12, wherein the polymer is a polymer comprising units of one or more polymerizable mono-olefins or di-olefins, which is soluble in the hydrocarbon base fluid.

22. A method for drilling a well comprising the steps of:
adding an effective amount of a foaming composition to a hydrocarbon base fluid to form a foamable hydrocarbon drilling fluid, where the foaming composition comprises a foaming agent; and
mixing the foamable hydrocarbon drilling fluid with a gas under conditions to dissolve the gas in the fluid to form a pre-foam including an amount of solubilized gas sufficient to produce a foam having a foam height of at least 150 mL and a half life of at least 2 minutes based on 100 mL of fluid, when the pre-foam undergoes a pressure drop,
pumping the pre-foam into a drill string while drilling, where the pre-foam prevents pump cavitation or vapor locking encountered in traditional gas-liquid drilling fluid combinations,
producing a foam when the pre-foam undergoes the pressure drop sufficient to convert the pre-foam into the foam, where the foam decreases a weight of the fluid column, increases a fluid removal rate from the well and increases the removal of cuttings and other entrained materials in the foam, and
withdrawing the foam from the well.

23. The method of claim 22, wherein the foaming composition further comprises a polymer or a gelling agent and a cross-linking agent, or mixtures or combinations thereof.

24. The method of claim 23, wherein the polymer is a polymer comprising units of one or more polymerizable mono-olefins or di-olefins, which is soluble in and increases the viscosity of the hydrocarbon base fluid.

25. The method of claim 23, wherein the gelling agent is selected from the group consisting of phosphate esters and mixtures or combinations thereof and its cross-linking agent is selected from the group consisting of di-, tri or tetra-valent metal salts selected from the group consisting of calcium salts, magnesium salts, cerium salts, barium salts, copper salts, cobalt salts, chromium salts, manganese salts, titanium salts, iron salts, zinc salts, zirconium salts, aluminum salts, other transition metal salts, actinide metal salts or lanthanide metal salts capable of acting as a phosphate ester cross-linking agent and mixtures or combinations thereof.

26. The method of claim 22, further comprising the step of:
after the withdrawing step, breaking the foam with a sufficient amount of a defoaming agent.

27. The method of claim 22, wherein the foaming agent is selected from the group consisting of silicone foaming agents, fluorinated foaming agents, and mixtures or combinations thereof.

28. The method of claim 22, wherein the hydrocarbon base fluid is selected from the group consisting of synthetic hydrocarbon fluids, petroleum based hydrocarbon fluids, natural hydrocarbon (non-aqueous) fluids or other similar hydrocarbons or mixtures or combinations thereof.

29. The method of claim 22, wherein the hydrocarbon base fluid is selected from the group consisting of polyalphaolefins, polybutenes, polyolesters, biodiesels, simple low molecular weight fatty esters of vegetable or vegetable oil fractions, simple esters of alcohols, vegetable oils, animal oils or esters, other essential oil, diesel having a low or high sulfur content, kerosene, jet-fuel, white oils, mineral oils, mineral seal oils, hydrogenated oil, internal olefins having between about 12 and 20 carbon atoms, linear alpha olefins having between about 14 and 20 carbon atoms, polyalpha olefins having between about 12 and about 20 carbon atoms, isomerized alpha olefins having between about 12 and about 20 carbon atoms, VM&P Naptha, Linpar, Parafins having between 13 and about 16 carbon atoms, and mixtures or combinations thereof.

* * * * *